(No Model.)
A. R. MIRANDA.
VAPORIZER.
No. 491,902. Patented Feb. 14, 1893.
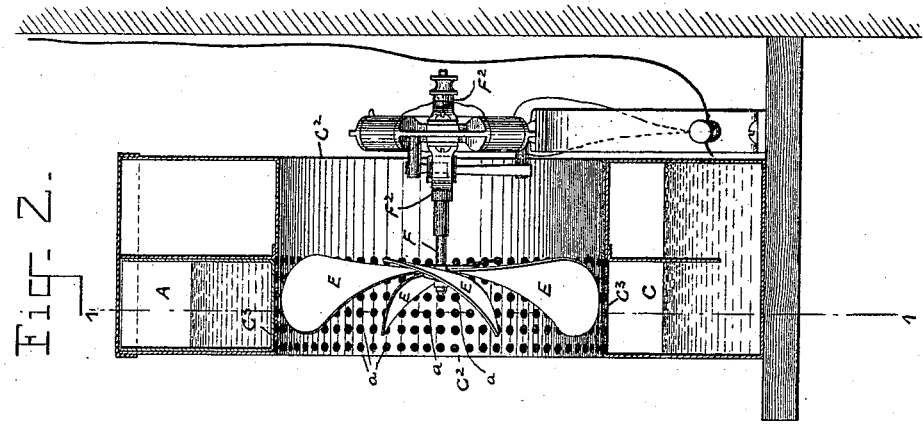
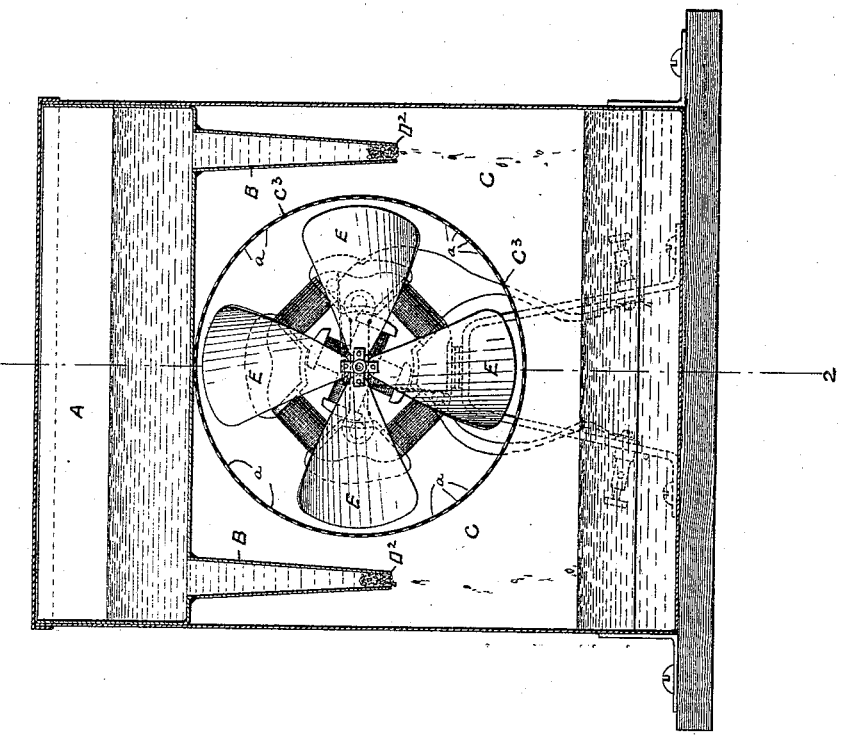
Witnesses.
John F. Nelson
Marion E. Brown
Inventor.
Abraham R. Miranda
by his Attorneys
Brown Bros

UNITED STATES PATENT OFFICE.

ABRAHAM R. MIRANDA, OF BOSTON, ASSIGNOR, BY DIRECT AND MESNE ASSIGNMENTS, TO FRANK M. FERRM, OF NATICK, MASSACHUSETTS.

VAPORIZER.

SPECIFICATION forming part of Letters Patent No. 491,902, dated February 14, 1893.

Application filed November 17, 1891. Serial No. 412,240. (No model.)

*To all whom it may concern:*

Be it known that I, ABRAHAM R. MIRANDA, a citizen of the United States of America, and a resident of the city of Boston, in the county of Suffolk and State of Massachusetts, have invented a certain new and useful Improved Apparatus for Distributing Disinfectants, &c., of which the following is a full, clear, and exact description.

This invention relates to an apparatus more especially intended for distributing vapors arising from disinfectants but it is applicable as well to distributing vapors arising from other materials.

The drawings, forming part of this specification, illustrate an apparatus of my invention.

Figure 1 is a vertical section, line 1—1, Fig. 2, and Fig. 2 is a vertical section, line 2—2, Fig. 1.

In the drawings, A is the receptacle.

B, B are means for discharging the contents of the receptacle A in drops, globules or other small particles, atoms, &c., and C is the chamber to receive the material discharge as aforesaid.

The receptacle A and the chamber C, preferably are contained in one inclosure and as a whole made either of sheet metal or other suitable material. The receptacle A is directly over the chamber C, and the chamber preferably at its central portion $C^2$ is open from front to rear, and this opening is surrounded and closed between the front and rear walls of the chamber by a plate $C^3$ of sheet metal or other suitable material having rows of perforations $a$ as particularly shown extending about its entire periphery and a portion of its width. In lieu of perforated sheet metal, a netting of wire, or of other suitable material, or any other material suitable for the working of the apparatus of this invention, as hereinafter appears, may be used.

The discharging means B, B for the contents of the receptacle A as particularly shown consist of two downwardly tapering tubes one at each side of the central opening $C^2$ of the chamber C and each at its lower end-portion closed as at $D^2$ by spongy or porous or other material suitable to cause the contents of the receptacle A to percolate or sift or otherwise to pass and escape into the chamber C in the form of globules or drops, if the material be a liquid and in small particles or atoms, if the material be a solid. The discharging ends of said tubes are situated in the chamber C so that the globules, &c., issuing therefrom will be exposed in falling sufficiently for their gases to escape within the field of the perforated wall of the central opening $C^2$ of the chamber C and thence to pass from the chamber out through the perforations of said wall and into and by combining with the air of the room &c., in which the apparatus is placed to there be distributed and diffused.

If the receptacle A be charged with a disinfectant, either in the form of a liquid or of a solid in fine particles or atoms, obviously an apparatus of the construction and operation described will act to disinfect and purify the air of the room &c., in which the apparatus is placed. But the receptacle may be charged with other materials, as for instance, such as those capable of imparting a pleasing perfume or odor to the air of the room in which the apparatus is placed.

So far as described, the distributing of the gases on escaping within the chamber, C, from the material with which the receptacle A is charged, is dependent practically on natural causes. For active distribution of the air from the central opening $C^2$ into the room a rotary-fan E is located within the central opening $C^2$ of the chamber and there arranged to be rotated by means of a horizontal shaft F to which it is attached and which at its opposite end-portions is arranged to turn in fixed supports and bearings $F^2$ and by the operation of an electric motor G connected to said shaft and of any suitable construction and otherwise of suitable arrangement and electric connection, or by the operation of any other suitable motor. An electric motor however is in many cases most preferable.

Having thus described my invention what I claim and desire to secure by Letters Patent is:—

In combination, a reservoir for liquid disinfectant, a chamber below said reservoir and having a horizontal open way, open at its opposite ends, and surrounded by a perforated wall, distributing pipes leading from said reservoir into said chamber and having their discharging ends along side of but away from said perforated wall, and a rotary fan located in said open way, all as described, for operation and purposes specified.

In testimony whereof I have hereunto set my hand in the presence of two subscribing witnesses.

A. R. MIRANDA.

Witnesses:
 ALBERT W. BROWN,
 MARION E. BROWN.

It is hereby certified that the name of the assignee in Letters Patent No. 491,902, granted February 14, 1893, upon the application of Abraham R. Miranda, of Boston, Massachusetts, for an improvement in "Vaporizers," was erroneously written and printed "Frank M. Ferrm," whereas said name should have been written and printed *Frank M. Ferrin;* and that the said Letters Patent should be read with this correction therein that the same may conform to the record of the case in the Patent Office.

Signed, countersigned, and sealed this 28th day of February, A. D. 1893.

[SEAL.]                 CYRUS BUSSEY,
                   *Assistant Secretary of the Interior.*

Countersigned:
 W. E. SIMONDS,
  *Commissioner of Patents.*